United States Patent
Schuck et al.

(10) Patent No.: US 11,225,287 B1
(45) Date of Patent: Jan. 18, 2022

(54) AXLE SYSTEM HAVING AN AXLE LIFT KIT AND METHOD OF ASSEMBLY

(71) Applicant: ArvinMeritor Technology, LLC, Troy, MI (US)

(72) Inventors: Luis Gustavo Schuck, Troy, MI (US); Craig Allen Holt, Chesterfield, MI (US); Sarvesh Satam, Troy, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 0 days.

(21) Appl. No.: 16/928,565

(22) Filed: Jul. 14, 2020

(51) Int. Cl.
*B62D 21/11* (2006.01)
*B60G 7/00* (2006.01)
*B60G 11/27* (2006.01)
*B60G 13/00* (2006.01)

(52) U.S. Cl.
CPC .............. *B62D 21/11* (2013.01); *B60G 7/001* (2013.01); *B60G 11/27* (2013.01); *B60G 13/005* (2013.01); *B60G 2200/20* (2013.01); *B60G 2202/152* (2013.01); *B60G 2202/20* (2013.01); *B60G 2204/14* (2013.01); *B60G 2206/8207* (2013.01)

(58) Field of Classification Search
CPC ...... B62D 21/11; B62D 61/12; B62D 61/125; B60G 7/001; B60G 13/005; B60G 11/27; B60G 2200/20; B60G 2204/14; B60G 2206/8207; B60G 2202/152; B60G 2202/20
See application file for complete search history.

(56) References Cited

U.S. PATENT DOCUMENTS

| | | | | |
|---|---|---|---|---|
| 5,620,194 A * | 4/1997 | Keeler | ................... | B62D 7/144 280/81.6 |
| 6,073,946 A * | 6/2000 | Richardson | ............ | B60G 11/28 280/124.128 |
| 6,416,069 B1 * | 7/2002 | Ramsey | ................. | B60G 11/27 280/124.116 |
| 7,434,821 B2 * | 10/2008 | Hinz | ...................... | B60G 7/001 280/124.116 |
| 8,522,933 B2 * | 9/2013 | Chalin | ................... | B60G 11/28 188/266 |
| 9,422,014 B1 | 8/2016 | Schuck | | |
| 10,011,153 B1 * | 7/2018 | Klein | ...................... | B60G 11/28 |
| 2004/0084866 A1 * | 5/2004 | Ramsey | ................. | B62D 13/06 280/124.128 |
| 2014/0232080 A1 * | 8/2014 | Karel | ..................... | B60G 11/27 280/86.5 |

FOREIGN PATENT DOCUMENTS

WO   WO-2016022024 A1 *   2/2016   ............. B60G 11/12

OTHER PUBLICATIONS

Meritor Heavy Vehicle Systems, LLC, "Meritor Trailer Products," copyright 2012, Meritor, Inc., Troy, Michigan; 12 Pages.
Hendrickson Trailer Commercial Vehicle Systems, UBL—005 & UBL-005GV Lift Kit for AANL 23K, 2008, Canton, Ohio.
Hendrickson Trailer Commercial Vehicle Systems, Under Beam Lift, 2018, Canton, Ohio.

* cited by examiner

*Primary Examiner* — Laura Freedman
(74) *Attorney, Agent, or Firm* — Brooks Kushman PC

(57) ABSTRACT

An axle system and a method of assembly. The axle system may include an axle lift kit. The axle lift kit may have a first bracket subassembly that may be fastened to the hanger bracket and a second bracket subassembly that may be fastened to first and second lateral sides of the trailing arm.

20 Claims, 7 Drawing Sheets

AXLE SYSTEM HAVING AN AXLE LIFT KIT AND METHOD OF ASSEMBLY

TECHNICAL FIELD

This document relates to an axle system having an axle lift kit and a method of assembly.

BACKGROUND

An axle lift system is disclosed in U.S. Pat. No. 9,422,014.

SUMMARY

In at least one embodiment, an axle system is provided. The axle system may include an axle, a hanger bracket, a trailing arm, and an axle lift kit. The trailing arm may be fixedly coupled to the axle. The trailing arm may be rotatably coupled to the hanger bracket such that the trailing arm may be rotatable about a pivot axis with respect to the hanger bracket. The trailing arm may have a first lateral side and a second lateral side that may be disposed opposite the first lateral side. The axle lift kit may include a first bracket subassembly, a second bracket subassembly, and a lift air spring. The first bracket subassembly may be fastened to the hanger bracket. The second bracket subassembly may be fastened to the first and second lateral sides of the trailing arm. The lift air spring may extend between the first bracket subassembly and the second bracket subassembly and may be configured to rotate the trailing arm about the pivot axis.

In at least one embodiment, a method of assembling an axle system is provided. The method may include providing a trailing arm that may be rotatably mounted to a hanger bracket. An axle lift kit may be installed by fastening a first bracket subassembly of the axle lift kit to the hanger bracket and fastening a second bracket subassembly of the axle lift kit to the first and second lateral sides of the trailing arm. The first lateral side may be disposed opposite the second lateral side and the first and second lateral sides may partially extend into the hanger bracket.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
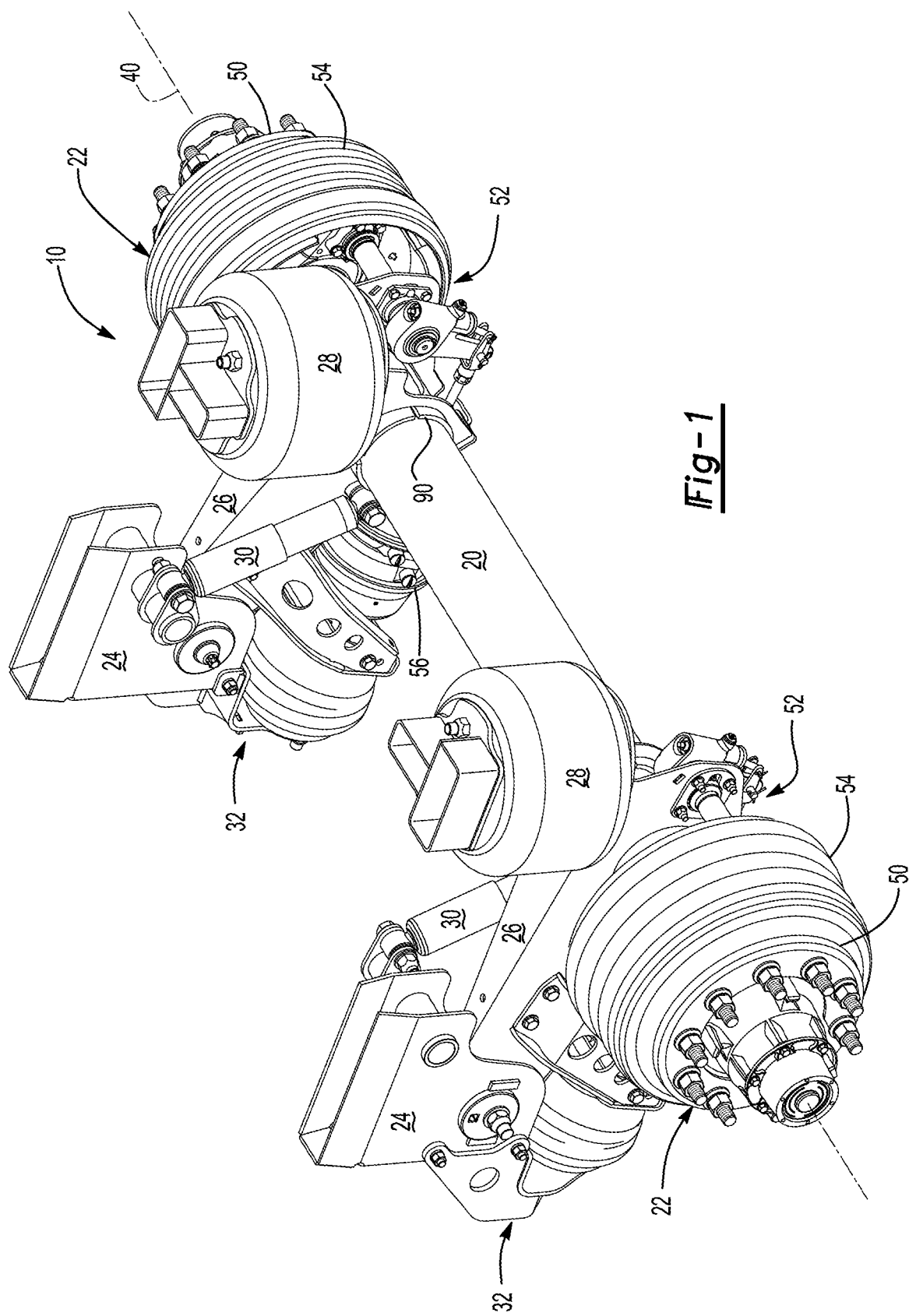
FIG. 1 is a perspective view of an example of an axle system.
Figure 3:
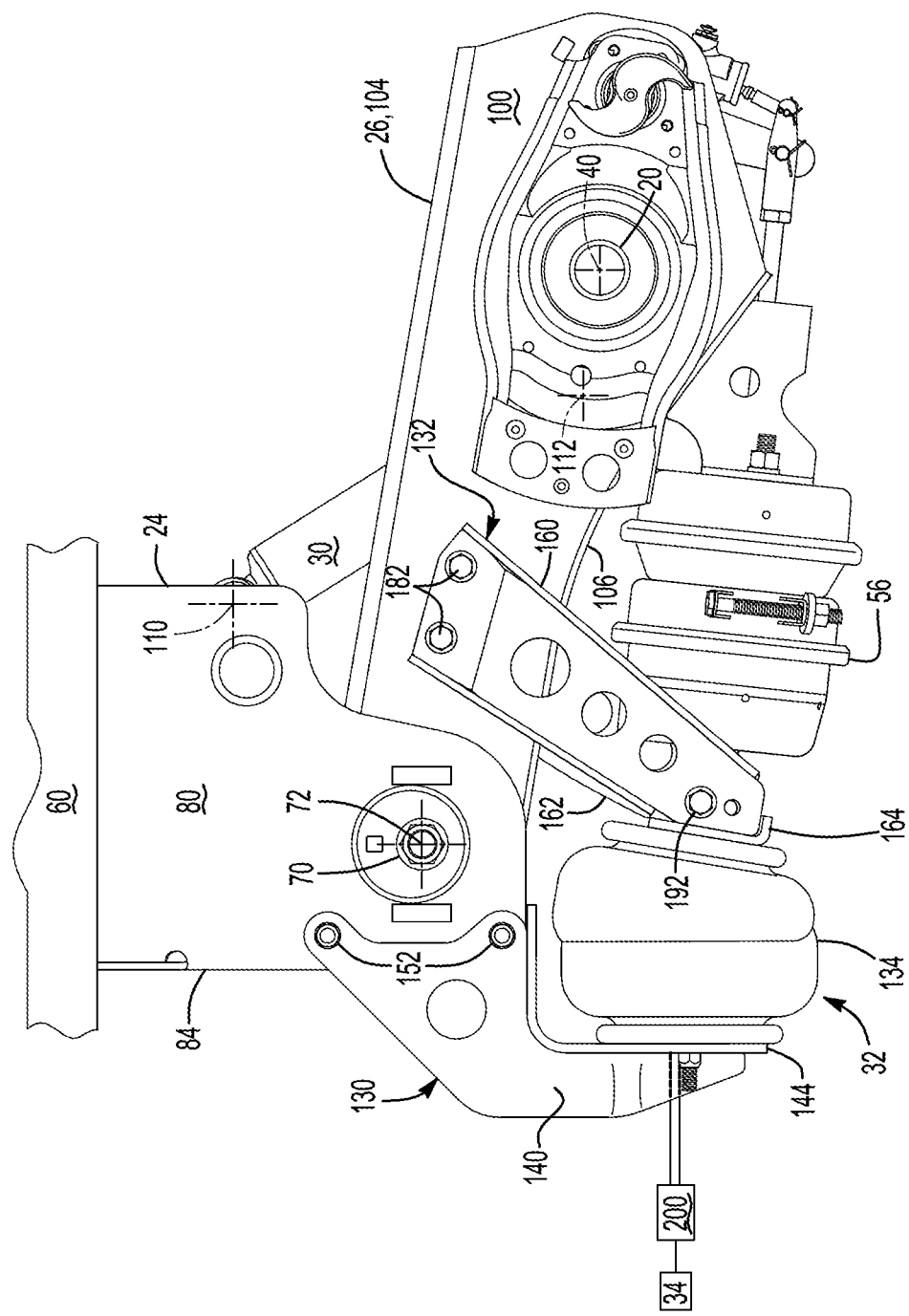
FIG. 3 is a side view of a portion of the axle system in a first position with the wheel end assemblies and air springs omitted for clarity.
Figure 4:
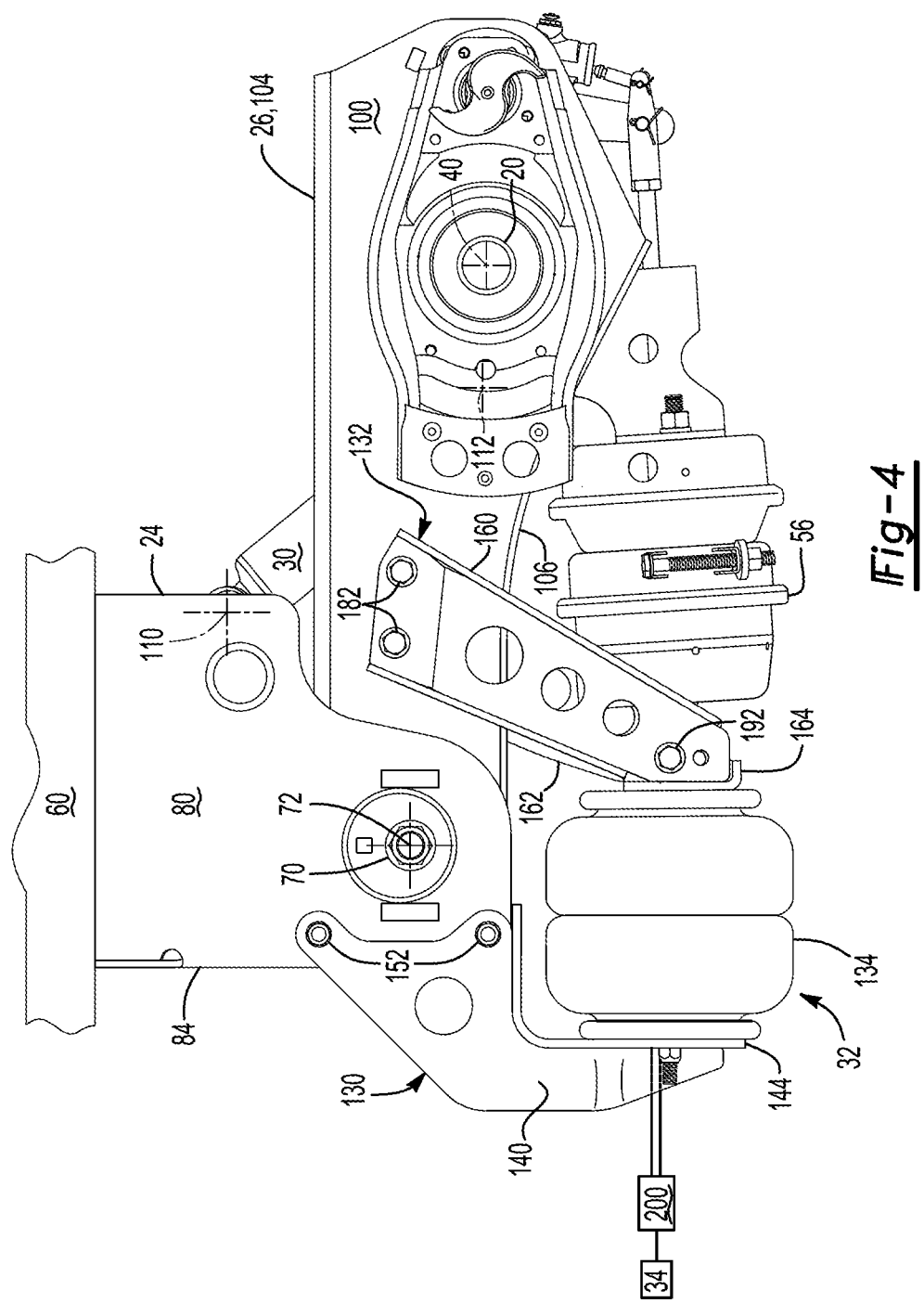
FIG. 4 is a side view of a portion of the axle system in a second position with the wheel end assemblies and air springs omitted for clarity.

Referring to FIG. 1, an example of an axle system 10 is shown. The axle system 10 may be provided with a vehicle, such as motor vehicle or a trailer that may be provided with a motor vehicle. The axle system 10 may include an axle 20 that may support a wheel end assembly 22. The axle system 10 may include a hanger bracket 24, a trailing arm 26, an air spring 28, a shock absorber 30, and an axle lift kit 32. These components may be provided in pairs and may be grouped together and positioned near a corresponding wheel end assembly 22. A control system 34, which is shown in FIGS. 3 and 4, may control operation of the axle system 10.

Figure 2:
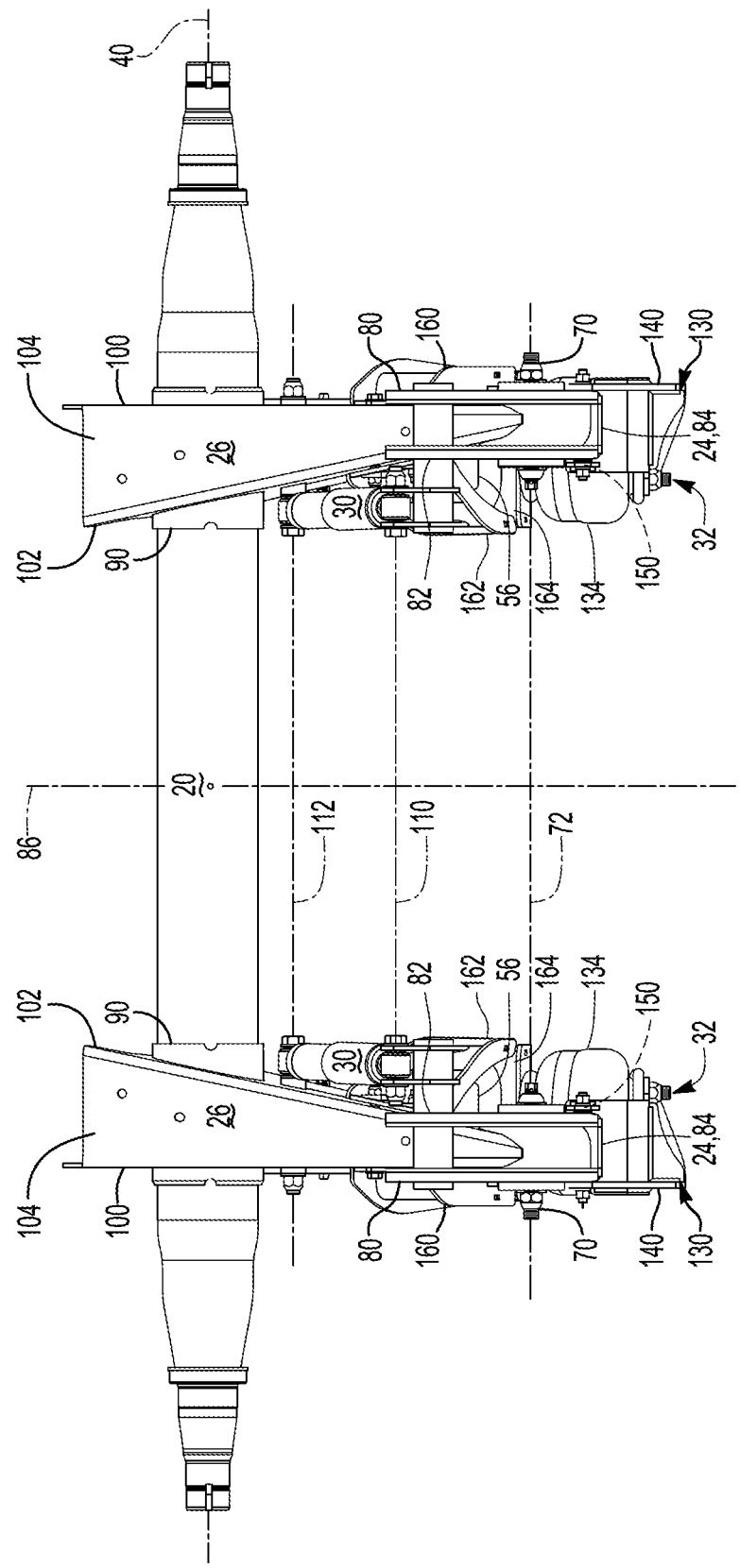
FIG. 2 is a top view of the axle system with wheel end assemblies and air springs omitted for clarity.

Referring to FIGS. 1 and 2, the axle 20 may extend along an axle axis 40. The axle 20 may have a generally tubular or cylindrical configuration and may provide a structure that may support and facilitate mounting of other components of the axle system 10.

Referring to FIG. 1, a wheel end assembly 22 may be mountable at an end of the axle. In the configuration shown, two wheel end assemblies 22 are provided and are mounted at opposing ends of the axle 20. A wheel end assembly 22 may include a hub 50 and a brake subsystem 52.

The hub 50 may be rotatably disposed on the axle 20. The hub 50 may be rotatable about the axle axis 40 and may facilitate mounting of a wheel upon which a tire may be mounted. For example, the hub 50 may include a plurality of mounting studs that may extend through a wheel in a manner known by those skilled in the art.

The brake subsystem 52 may be configured to brake or inhibit rotation of an associated hub 50. The brake subsystem 52 may be mounted to the axle 20 proximate an end of the axle 20. The brake subsystem 52 may be configured as a friction brake, such as a drum brake or a disc brake. In the configuration shown in FIG. 1, the brake subsystem 52 is configured as a drum brake and may include a pair of brake pads that may be received inside a brake drum 54. A brake actuator 56 may actuate the brake pads into engagement with the brake drum 54 to provide a brake torque that may slow or stop rotation of an associated hub 50 in a manner known by those skilled in the art.

The hanger bracket 24 may facilitate mounting of the axle system 10 to a frame or chassis 60 of the vehicle, which is best shown in FIGS. 3 and 4. The hanger bracket 24 may be fixedly positioned with respect to the chassis 60. For instance, the hanger bracket 24 may be mounted to the chassis 60 along a top side. The hanger bracket 24 may have a generally hollow box-like configuration and may receive an end of the trailing arm 26. A pivot pin 70 may rotatably couple the trailing arm 26 to the hanger bracket 24. For example, the pivot pin 70 may extend along a pivot axis 72 and may extend through the hanger bracket 24 and the trailing arm 26 to rotatably couple the trailing arm 26 to the hanger bracket 24 such that the trailing arm 26 may be rotatable about the pivot axis 72 with respect to the hanger bracket 24. As is best shown in FIG. 2, the pivot axis 72 may extend substantially parallel to the axle axis 40. In at least one configuration and as is best shown with reference to FIGS. 2-5, the hanger bracket 24 may include a first hanger bracket lateral side 80, a second hanger bracket lateral side 82, and a connecting hanger side 84.

The first hanger bracket lateral side 80 may face outboard or away from a center plane 86, which is best shown in FIG. 2. The center plane 86 may bisect the axle 20 or may be equidistantly disposed between the hanger brackets 24. The center plane 86 may be disposed substantially perpendicular to the axle axis 40. In at least one configuration, the first hanger bracket lateral side 80 may be disposed substantially parallel to the center plane 86 and may be disposed substantially perpendicular to the pivot axis 72.

The second hanger bracket lateral side 82 may be disposed opposite the first hanger bracket lateral side 80. As such, the second hanger bracket lateral side 82 may face inboard or toward the center plane 86. In at least one embodiment, the second hanger bracket lateral side 82 may be disposed substantially parallel to the first hanger bracket lateral side 80.

The connecting hanger side 84 may extend from the first hanger bracket lateral side 80 to the second hanger bracket lateral side 82. The connecting hanger side 84 may face away from the axle 20. The connecting hanger side 84 may be disposed substantially perpendicular to the first hanger bracket lateral side 80, the second hanger bracket lateral side 82, or both in one or more configurations.

Referring to FIGS. 1 and 2, the trailing arm 26 may extend between the axle 20 and the hanger bracket 24. In FIG. 1, two trailing arms 26 are illustrated that are spaced apart from each other. The trailing arms 26 may have the same configuration or a similar configuration. For instance, the trailing arms 26 may have mirror symmetry with respect to the center plane 86. The trailing arm 26 may be fixedly coupled to the axle 20 in any suitable manner. For example, the trailing arm 26 may be secured to an axle wrap 90 that may be fixedly disposed on the axle 20 and that may extend at least partially around an exterior surface of the axle 20. The trailing arm 26 may extend away from the axle 20 toward the hanger bracket 24. The trailing arm 26 may have a generally hollow construction. In at least one configuration and as is best shown with reference to FIGS. 2-4 and 6, the trailing arm 26 may include a first lateral side 100, a second lateral side 102, a top side 104, and a bottom side 106.

The first lateral side 100 may face outboard or away from the center plane 86. The first lateral side 100 may extend into and may be partially received inside the hanger bracket 24. As such, the first lateral side 100 or a portion thereof may face toward the first hanger bracket lateral side 80. In at least one configuration, the first lateral side 100 may be disposed substantially perpendicular to the pivot axis 72.

The second lateral side 102 may be disposed opposite the first lateral side 100. The second lateral side 102 may extend into and may be partially received inside the hanger bracket 24. As such, the second lateral side 102 or a portion thereof may face toward the second hanger bracket lateral side 82. In at least one configuration, a portion of the second lateral side 102 may be disposed in a nonparallel relationship with the first lateral side 100. For instance, the second lateral side 102 may extend further away from the first lateral side 100 as the trailing arm 26 extends toward the axle 20.

The top side 104 may face toward the chassis 60. In addition, the top side 104 may extend from the first lateral side 100 to the second lateral side 102.

The bottom side 106 may be disposed opposite the top side 104. As such, the bottom side 106 may face away from the hanger bracket 24. The bottom side 106 may extend from the first lateral side 100 to the second lateral side 102.

Referring to FIG. 1, the air spring 28 may be mounted to the trailing arm 26. For example, the air spring 28 may be disposed proximate an end of the trailing arm 26 that may be disposed opposite the hanger bracket 24. The air spring 28 may extend from the trailing arm 26 to the chassis 60 and may be configured to dampen vibrations associated with vehicle travel, provide a desired level of ride quality, control vehicle ride height, or combinations thereof.

The shock absorber 30 may be provided to dampen impulses and to dissipate kinetic energy transmitted to the axle system 10. The shock absorber 30 may be pivotally mounted to the hanger bracket 24 at a first end and may be pivotally mounted to the trailing arm 26 at a second end. More specifically and as is best shown with reference to FIGS. 2-4, the shock absorber 30 may be pivotally mounted to the hanger bracket 24 along an upper shock absorber pivot axis 110 and may be pivotally mounted to the trailing arm 26 along a lower shock absorber pivot axis 112. The upper shock absorber pivot axis 110 and the lower shock absorber pivot axis 112 may be disposed substantially parallel to each other and substantially parallel to the pivot axis 72.

Referring to FIGS. 1-4, the axle lift kit 32 may facilitate lifting of the axle 20. For instance, the axle lift kit 32 may selectively raise and hold the axle 20 in an elevated position or lifted position such that its wheel end assemblies 22 and associated tires are raised or lifted from a support surface, such as a road or the ground, toward the chassis 60 and do not engage the support surface to support the weight of the vehicle. The tires may be disposed on the support surface when they are not held in the elevated position or lifted position by the axle lift kit 32, and thus may support the vehicle and facilitate movement of the vehicle. In at least one configuration and as is best shown with reference to FIGS. 2-5, the axle lift kit 32 may include a first bracket subassembly 130 a second bracket subassembly 132, and a lift air spring 134.

Figure 5:
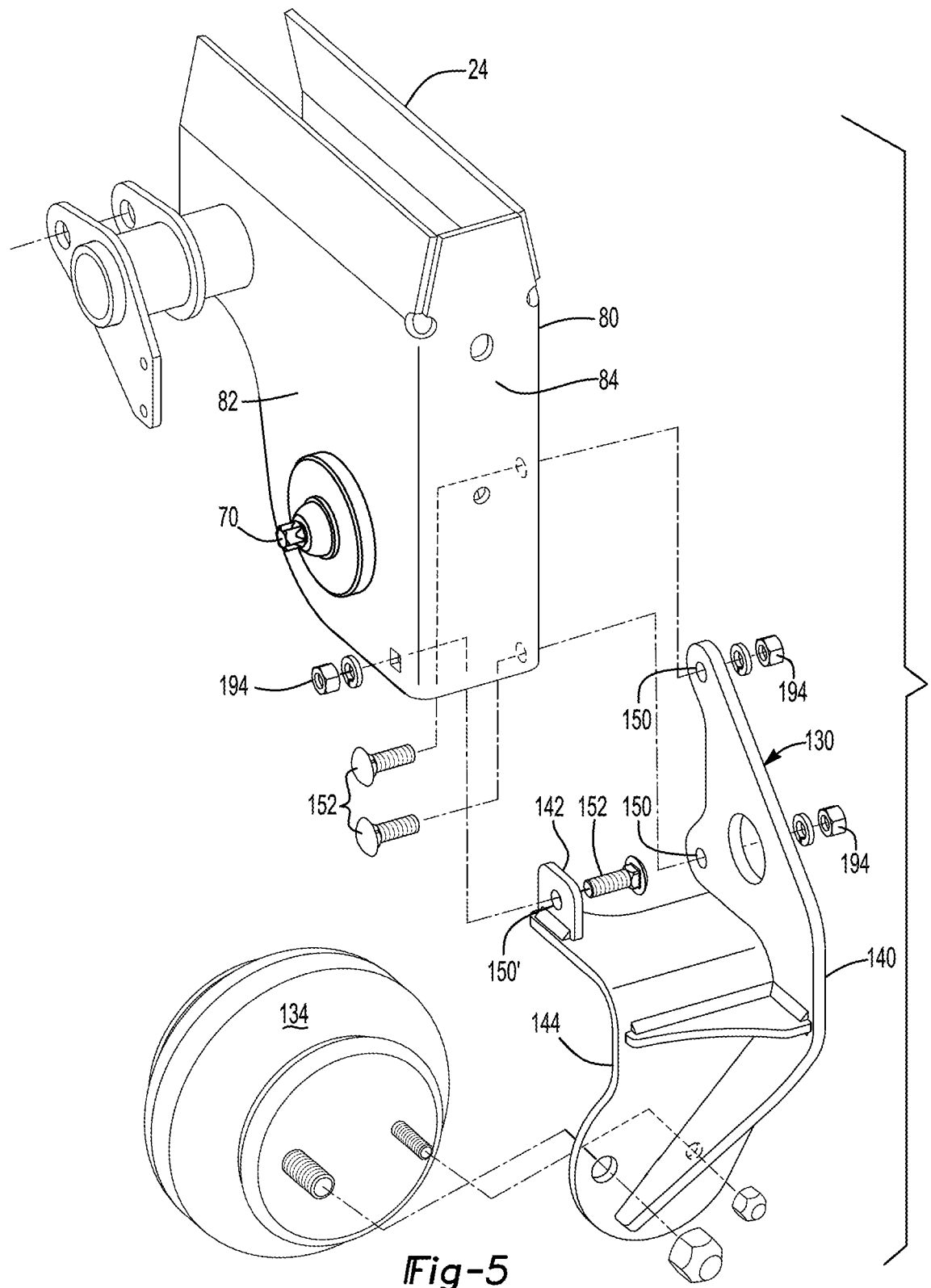
FIG. 5 is an exploded view showing a first bracket subassembly of an axle lift kit that may be mounted to a hanger bracket of the axle system.

The first bracket subassembly 130, which is best shown individually in FIG. 5, may be fastened to the hanger bracket 24. More specifically, the first bracket subassembly 130 may engage or contact the first hanger bracket lateral side 80 and the second hanger bracket lateral side 82 of the hanger bracket 24 and may be fastened to the first hanger bracket lateral side 80 and the second hanger bracket lateral side 82. The first bracket subassembly 130 may not be fastened to the connecting hanger side 84. The first bracket subassembly 130 may be completely disposed outside of the hanger bracket 24. In at least one configuration, the first bracket subassembly 130 may include a first side member 140, a second side member 142, and a cross member 144.

The first side member 140 may engage or contact the first hanger bracket lateral side 80 of the hanger bracket 24. The first side member 140 may be spaced apart from the second side member 142. The first side member 140 may have one or more holes 150 that may receive a fastener 152, such as a bolt, that may secure the first side member 140 to the first hanger bracket lateral side 80 of the hanger bracket 24.

The second side member 142 may engage or contact the second hanger bracket lateral side 82 of the hanger bracket 24. In at least one configuration, the second side member 142 may have a hole 150' that may receive a fastener 152, such as a bolt, that may secure the second side member 142 to the second hanger bracket lateral side 82 of the hanger bracket 24. Different fasteners 152 may be received in each of the holes 150, 150'. The fasteners 152 may extend substantially parallel to the pivot axis 72.

The cross member 144 may extend from the first side member 140 to the second side member 142. The cross member 144 may extend underneath the hanger bracket 24 and may support the lift air spring 134.

Figure 6:
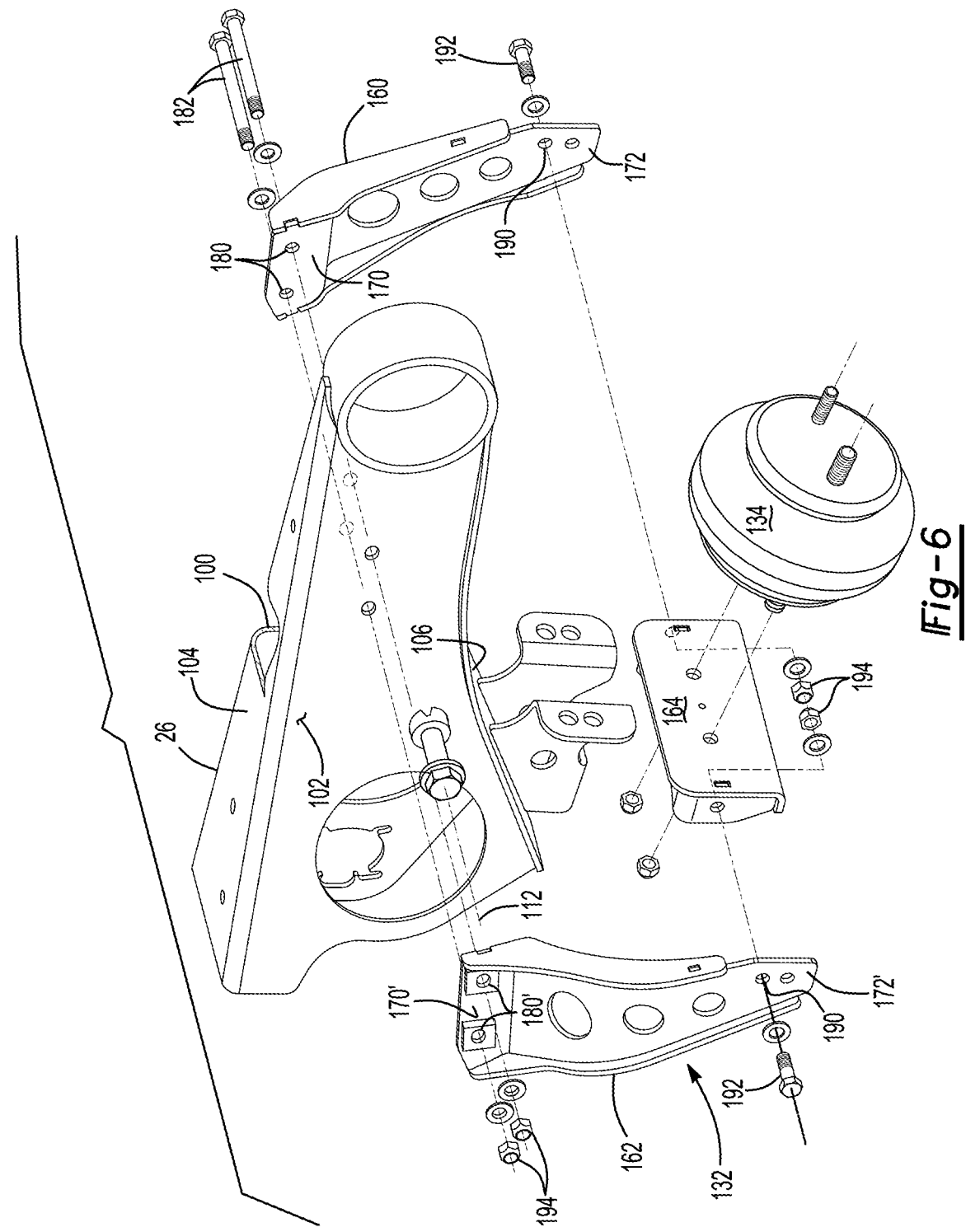
FIG. 6 is an exploded view showing a second bracket subassembly of the axle lift kit that may be mounted to a trailing arm of the axle system.
Figure 7:
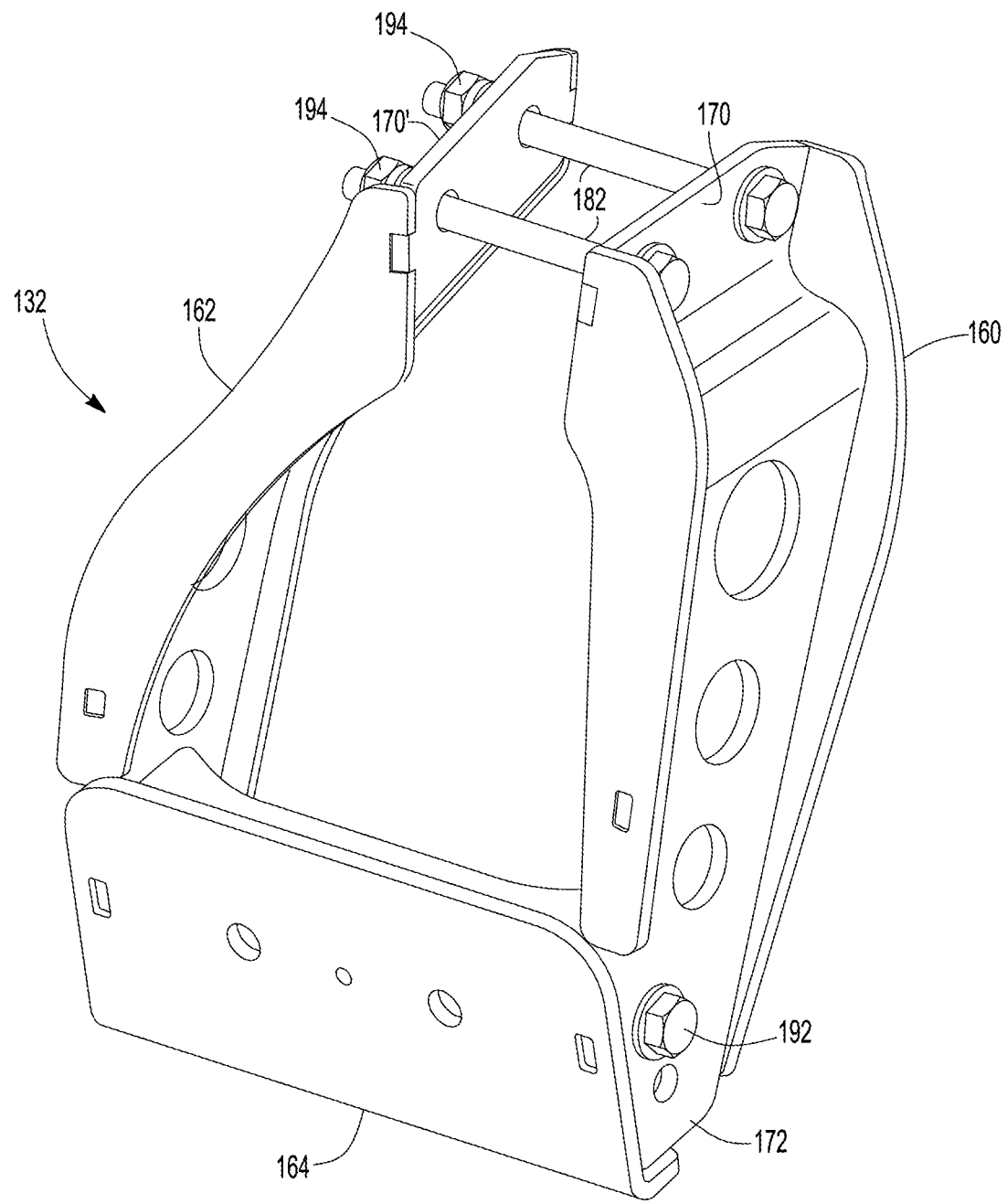
FIG. 7 is an assembled perspective view showing the second bracket subassembly.

The second bracket subassembly 132, which is best shown individually in FIGS. 6 and 7, may be fastened to the trailing arm 26. More specifically, the second bracket subassembly 132 may engage or contact the first lateral side 100 and the second lateral side 102 of the trailing arm 26 and may be mounted to or fastened to the first lateral side 100 and the second lateral side 102. The second bracket subassembly 132 may be spaced apart from and may not be attached to the bottom side 106 of the trailing arm 26. The second bracket subassembly 132 may be completely disposed outside of the hanger bracket 24 as is best shown in FIGS. 3 and 4. In at least one configuration, the second bracket subassembly 132 may include a first side member 160, a second side member 162, and a cross member 164.

The first side member 160 may engage or contact the first lateral side 100 of the trailing arm 26. The first side member 160 may be spaced apart from the second side member 162. In at least one configuration, the first side member 160 may have an upper flange 170 and a lower flange 172.

The upper flange 170 may engage or contact the first lateral side 100 of the trailing arm 26. The upper flange 170 may include one or more holes 180 that may receive a fastener 182, such as a bolt, that may secure the first side member 160 to the first lateral side 100 of the trailing arm 26.

The lower flange 172 may engage or contact the cross member 164. The lower flange 172 may include one or more holes 190 that may receive a fastener 192, such as a bolt, that may secure the first side member 160 to the cross member 164.

The second side member 162 may engage or contact the second lateral side 102 of the trailing arm 26. In at least one configuration, the second side member 162 may have an upper flange 170' and a lower flange 172'.

The upper flange 170' may engage or contact the second lateral side 102 of the trailing arm 26. The upper flange 170' may include one or more holes 180' that may receive a fastener 182, such as a bolt that may secure the second side member 162 to the second lateral side 102 of the trailing arm 26. For instance, a fastener 182 may extend through the holes 180, 180' of the upper flanges 170, 170' and through corresponding holes in the first and second lateral sides 100, 102 of the trailing arm 26. As such, the fastener 182 may couple the first side member 160 and the second side member 162 to the trailing arm 26. A retainer 194, such as a nut, may be coupled to the fastener 182 to inhibit axial movement and removal of the fastener 182. As is best shown in FIGS. 3 and 4, the fasteners 182 may be located closer to the axle 20 and the axle axis 40 than the upper shock absorber pivot axis 110 is located to the axle 20 and the axle axis 40.

The lower flange 172' may engage or contact the cross member 164. The lower flange 172' may include one or more holes 190 that may receive a fastener 192, such as a bolt, that may secure the first side member 160 to the cross member 164. For instance, a first fastener 192 may couple the first side member 160 to the cross member 164 and a second fastener 192 may couple the second side member 162 to the cross member 164. As is best shown with reference to FIGS. 2 and 3, the brake actuator 56 may be received between the first side member 160 and the second side member 162.

The cross member 164 may extend from the first side member 160 to the second side member 162. The cross member 164 may be spaced apart from the trailing arm 26 and may support the lift air spring 134.

Referring to FIGS. 3 and 4, the lift air spring 134 may extend between the first bracket subassembly 130 and the second bracket subassembly 132. The lift air spring 134 may be configured to control rotation of the trailing arm 26 about the pivot axis 72 and thereby move the axle between a lowered position, which is shown in FIG. 3, and a lifted position, which is shown in FIG. 4. The lift air spring 134 may be mounted to the cross member 144 of the first bracket subassembly 130 and to the cross member 164 of the second bracket subassembly 132. The lift air spring 134 may be fluidly connected to a pressurized gas source 200, such as a pump or tank that may provide a pressurized gas or pressurized gas mixture, such as air, to the lift air spring 134.

Referring to FIG. 1, the control system 34 may monitor and control operation of components and systems of the vehicle, such as the axle lift kit 32. The control system 34 may be configured to control the operation of the valves to control the flow of pressurized gas to the lift air spring 134 and to control venting of pressurized gas from the lift air spring 134. For example, the control system 34 may provide pressurized gas to inflate the lift air spring 134 to move the axle 20 from a first position or a lowered position as shown in FIG. 3 to a second position or a lifted position as shown in FIG. 4. Inflating the lift air spring 134 may push the second bracket subassembly 132 away from the first bracket subassembly 130, thereby rotating the trailing arm 26 about the pivot axis 72 in a counterclockwise direction from the perspective shown. Deflating the lift air spring 134 may allow the trailing arm 26 to rotate about the pivot axis 72 in a clockwise direction from the perspective shown in FIG. 4 and allow the second bracket subassembly 132 to move toward the first bracket subassembly 130 and toward the first position.

Inflation and deflation of the lift air spring 134 may be responsive to one or more signals that may be provided to the control system 34. For instance, the control system 34 may inflate or deflate the lift air spring 134 based on a manual command or operator command that may be provided by an input device, such as a button, switch, verbal command or the like. The control system 34 may inflate or deflate the lift air spring 134 automatically. Automatic inflation and deflation may be based on various signals or data, such as signals or date indicative of vehicle load, vehicle speed, or combinations thereof.

The axle lift kit 32 may be assembled to the hanger bracket 24 and the trailing arm 26 during initial fabrication of the axle system 10 or may be subsequently installed, such as after assembly of the trailer or vehicle. For instance, the axle lift kit 32 may be purchased as an aftermarket option and may be used to retrofit an axle system 10 to provide lift capability. The axle lift kit 32 may be installed by fastening the first bracket subassembly 130 to the hanger bracket 24 and fastening the second bracket subassembly 132 to the trailing arm 26 as previously described. The lift air spring 134 may be mounted to the first bracket subassembly 130 and the second bracket subassembly 132 after the first and second bracket subassemblies 130, 132 are fastened to the hanger bracket 24 and the trailing arm 26, respectively.

The axle lift kit 32 may be mounted to the hanger bracket 24 and the trailing arm 26 without welding. Eliminating welding may provide various benefits. First, paint must be removed from the hanger bracket 24 before the first bracket subassembly 130 can be welded to the hanger bracket 24. Similarly, paint must be removed from the trailing arm 26 before the second bracket subassembly 132 can be welded to the trailing arm 26. Thus, paint removal is not required when welding is eliminated. Second, paint must be reapplied after welding to avoid corrosion. Thus, repainting may be omitted when welding is eliminated. Third, temperature-sensitive components, such as components made of plastic or rubber, may need to be removed prior to welding to avoid damage when a weld is applied. Such component removal and subsequently reassembly may be avoided when welding is eliminated. Fourth, eliminating welding allows components of the axle lift kit such as the first bracket subassembly 130, the second bracket subassembly 132, or both to be fully galvanized to help prevent corrosion as providing suitable welds may incompatible with galvanized components. For instance, welding galvanized steel may result in compromised welds that may have undesirable inclusions or porosity due to the zinc coating found on galvanized steel. Moreover, welding galvanized steel may result in undesirable fumes. Fifth, using fasteners such as bolts to attach the axle lift kit 32 may allow the axle lift kit 32 to be installed more rapidly and more cost-effectively than installation by welding, which requires additional equipment and expertise.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An axle system comprising:
   an axle;
   a hanger bracket;
   a trailing arm that is fixedly coupled to the axle and rotatably coupled to the hanger bracket such that the trailing arm is rotatable about a pivot axis with respect to the hanger bracket, wherein the trailing arm has a bottom side that faces away from the hanger bracket, a first lateral side, and a second lateral side that is disposed opposite the first lateral side; and
   an axle lift kit that includes:
      a first bracket subassembly that is fastened to the hanger bracket;
      a second bracket subassembly that is fastened to the first lateral side and the second lateral side of the trailing arm, wherein the second bracket subassembly is spaced apart from and not attached to the bottom side; and
      a lift air spring that extends between the first bracket subassembly and the second bracket subassembly and is configured to rotate the trailing arm about the pivot axis.

2. The axle system of claim 1 wherein a bolt extends through the first lateral side and the second lateral side and couples the second bracket subassembly to the trailing arm.

3. The axle system of claim 1 wherein the first bracket subassembly includes a first side member that engages a first hanger bracket lateral side of the hanger bracket and a second side member that engages a second hanger bracket lateral side of the hanger bracket.

4. The axle system of claim 1 wherein the bottom side extends from the first lateral side to the second lateral side.

5. The axle system of claim 1 wherein the first lateral side and the second lateral side are partially received inside the hanger bracket, the first lateral side is disposed substantially perpendicular to the pivot axis, and the second lateral side is in a nonparallel relationship with the first lateral side.

6. The axle system of claim 1 wherein the second bracket subassembly is completely disposed outside of the hanger bracket.

7. The axle system of claim 1 wherein the second bracket subassembly includes a first side member that engages the first lateral side, a second side member that engages the second lateral side, and a cross member that extends from the first side member to the second side member, wherein the lift air spring is mounted to the cross member.

8. The axle system of claim 7 wherein the first side member is spaced apart from the second side member.

9. The axle system of claim 7 wherein the cross member is spaced apart from the trailing arm.

10. The axle system of claim 7 wherein a brake actuator is received between the first side member and the second side member.

11. The axle system of claim 7 wherein the first side member and the second side member have upper flanges that contact the first and second lateral sides, respectively, and a bolt extends through the upper flanges and the first and second lateral sides to couple the first side member and the second side member to the trailing arm.

12. The axle system of claim 11 wherein the first side member and the second side member have lower flanges that contact the cross member and the lower flanges of the first and second side members are coupled to the cross member with first and second bolts, respectively.

13. The axle system of claim 11 further comprising a shock absorber that is pivotally mounted to the hanger bracket along an upper shock absorber pivot axis and is pivotally mounted to the trailing arm along a lower shock absorber pivot axis, wherein the bolt is located closer to the axle than the upper shock absorber pivot axis is located to the axle.

14. An axle system comprising:
   an axle;
   a hanger bracket that includes a first hanger bracket lateral side and a second hanger bracket lateral side that is disposed opposite the first hanger bracket lateral side;
   a trailing arm that is fixedly coupled to the axle and rotatably coupled to the hanger bracket such that the trailing arm is rotatable about a pivot axis with respect to the hanger bracket, wherein the trailing arm has a first lateral side and a second lateral side that is disposed opposite the first lateral side; and
   an axle lift kit that includes:
      a first bracket subassembly that is fastened to the hanger bracket, wherein the first bracket subassembly includes a first side member that engages the first hanger bracket lateral side, a second side member that engages the second hanger bracket lateral side, and a cross member that extends from the first side member to the second side member;
      a second bracket subassembly that is fastened to the first lateral side and the second lateral side of the trailing arm; and
      a lift air spring that extends between the first bracket subassembly and the second bracket subassembly and is configured to rotate the trailing arm about the pivot axis, wherein the lift air spring is mounted to the cross member.

15. The axle system of claim 14 wherein a first bolt couples the first side member to the first hanger bracket lateral side, a second bolt couples the second side member to the second hanger bracket lateral side, and the first and second bolts extend substantially parallel to the pivot axis.

16. A method of assembling an axle system comprising:
providing a trailing arm that is rotatably mounted to a hanger bracket, wherein the trailing arm has a bottom side that faces away from the hanger bracket; and
installing an axle lift kit by:
fastening a first bracket subassembly to the hanger bracket; and
fastening a second bracket subassembly to a first lateral side and a second lateral side of the trailing arm, wherein the first lateral side is disposed opposite the second lateral side, the first and second lateral sides partially extend into the hanger bracket, and the second bracket subassembly is spaced apart from and not attached to the bottom side.

17. The method of claim 16 further comprising mounting a lift air spring to the first bracket subassembly and the second bracket subassembly.

18. The method of claim 16 wherein the second bracket subassembly is fastened with a bolt and is not welded to the trailing arm.

19. The method of claim 18 wherein the second bracket subassembly includes a first side member that engages the first lateral side, a second side member that engages the second lateral side, and a cross member that extends from the first side member to the second side member, and the first and second side members are fastened to the first and second lateral sides, respectively, before the cross member is fastened to the first and second side members.

20. The method of claim 19 wherein the bolt extends through the first side member, the first lateral side, the second lateral side, and the second side member.

* * * * *